(12) United States Patent
Keitsch et al.

(10) Patent No.: US 12,278,403 B2
(45) Date of Patent: Apr. 15, 2025

(54) BIPOLAR PLATE

(71) Applicant: AUDI AG, Ingolstadt (DE)

(72) Inventors: Oliver Keitsch, Heilbronn (DE); Fabian Lippl, Mannheim (DE)

(73) Assignee: AUDI AG, Ingolstadt (DE)

( * ) Notice: Subject to any disclaimer, the term of this patent is extended or adjusted under 35 U.S.C. 154(b) by 302 days.

(21) Appl. No.: 17/775,852

(22) PCT Filed: Apr. 27, 2021

(86) PCT No.: PCT/EP2021/060927
§ 371 (c)(1),
(2) Date: May 10, 2022

(87) PCT Pub. No.: WO2021/233647
PCT Pub. Date: Nov. 25, 2021

(65) Prior Publication Data
US 2023/0361318 A1    Nov. 9, 2023

(30) Foreign Application Priority Data

May 18, 2020   (DE) .......................... 102020113353.7

(51) Int. Cl.
*H01M 8/0258* (2016.01)
*H01M 8/0247* (2016.01)
*H01M 8/10* (2016.01)

(52) U.S. Cl.
CPC ....... *H01M 8/0258* (2013.01); *H01M 8/0247* (2013.01); *H01M 2008/1095* (2013.01)

(58) Field of Classification Search
CPC ............. H01M 8/0258; H01M 8/0247; H01M 2008/1095; H01M 8/028; H01M 8/0206; H01M 8/0256; H01M 8/04089; H01M 8/24; H01M 8/241; H01M 8/10; H01M 8/026
See application file for complete search history.

(56) References Cited

U.S. PATENT DOCUMENTS

| | | | |
|---|---|---|---|
| 7,491,463 B2 | 2/2009 | Friedman et al. | |
| 10,211,477 B2 | 2/2019 | Beutel et al. | |
| 10,547,069 B2* | 1/2020 | Kondo | H01M 8/0202 |
| 10,840,522 B2* | 11/2020 | Kondo | H01M 8/04156 |
| 2004/0157100 A1 | 8/2004 | Mizuno | |
| 2006/0099479 A1 | 5/2006 | Friedman et al. | |
| 2012/0129071 A1 | 5/2012 | Sato et al. | |
| 2018/0048012 A1* | 2/2018 | Beutel | H01M 8/0263 |

(Continued)

FOREIGN PATENT DOCUMENTS

| | | |
|---|---|---|
| CN | 107732278 A | 2/2018 |
| DE | 10163631 A1 | 7/2003 |

(Continued)

*Primary Examiner* — Stewart A Fraser
(74) *Attorney, Agent, or Firm* — Seed IP Law Group LLP

(57) ABSTRACT

A bipolar plate has a first inlet port and a flow field comprising a plurality of ducts to connect the first inlet port to a first outlet port for a first reactant, and has a second inlet port and a flow field comprising a plurality of ducts to connect the second inlet port to a second outlet port for a second reactant, wherein at least one bypass duct is present at the margin of at least one of the flow fields. The bypass duct is associated with at least one flow connection branching off from the bypass duct into an adjacent marginal duct of the flow field.

10 Claims, 6 Drawing Sheets

(56) References Cited

U.S. PATENT DOCUMENTS

2019/0214655 A1*  7/2019  Nishida ............. H01M 8/04089
2020/0028188 A1*  1/2020  Sasaki ................... H01M 8/242

FOREIGN PATENT DOCUMENTS

| DE | 102016225651 A1 | 12/2017 |
|----|-----------------|---------|
| DE | 102017118143 A1 | 2/2018  |
| DE | 202017103229 U1 | 10/2018 |
| EP | 2618413 A1      | 7/2013  |
| JP | 2007-115525 A   | 5/2007  |
| JP | 2008-282821 A   | 11/2008 |
| JP | 2013-201086 A   | 10/2013 |
| KR | 20120042376 A   | 5/2012  |
| WO | 2009/084183 A1  | 7/2009  |

* cited by examiner

State of the art

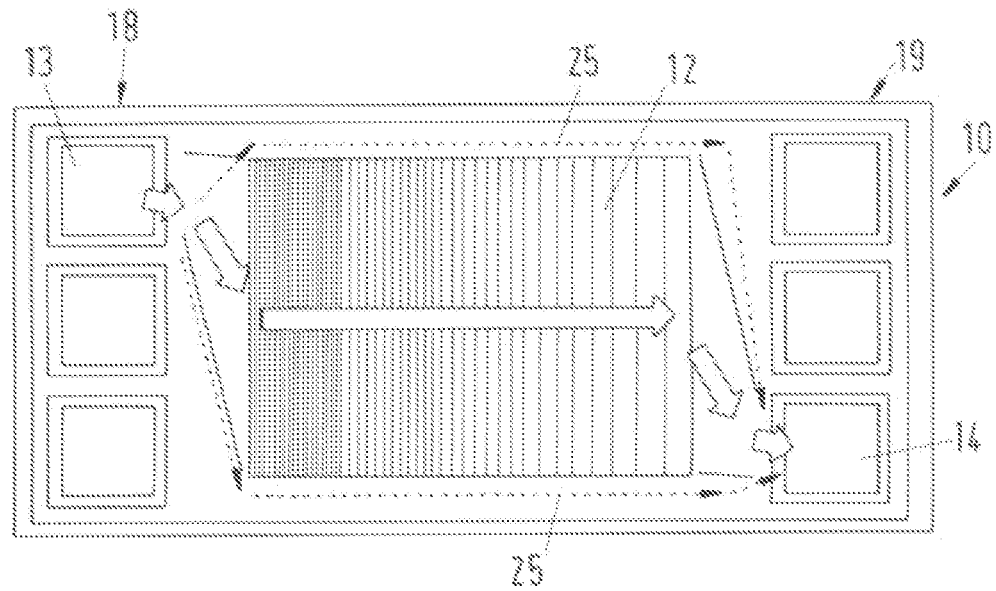
Fig.3  State of the art
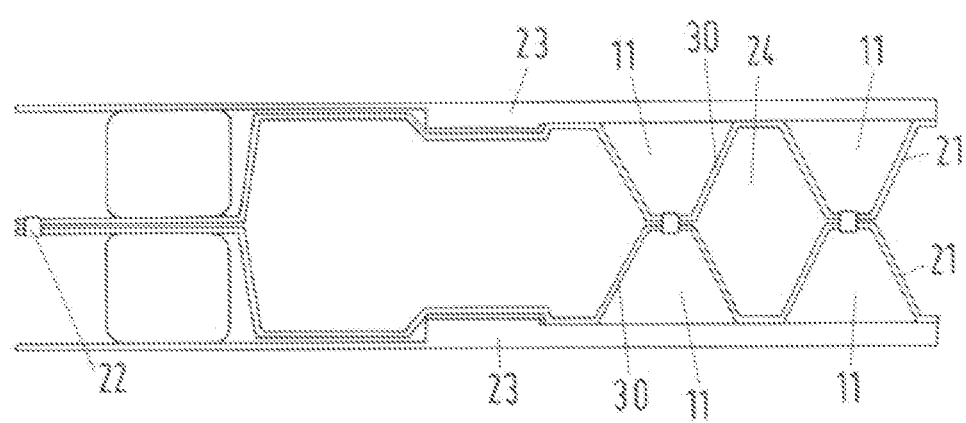
Fig.4  State of the art

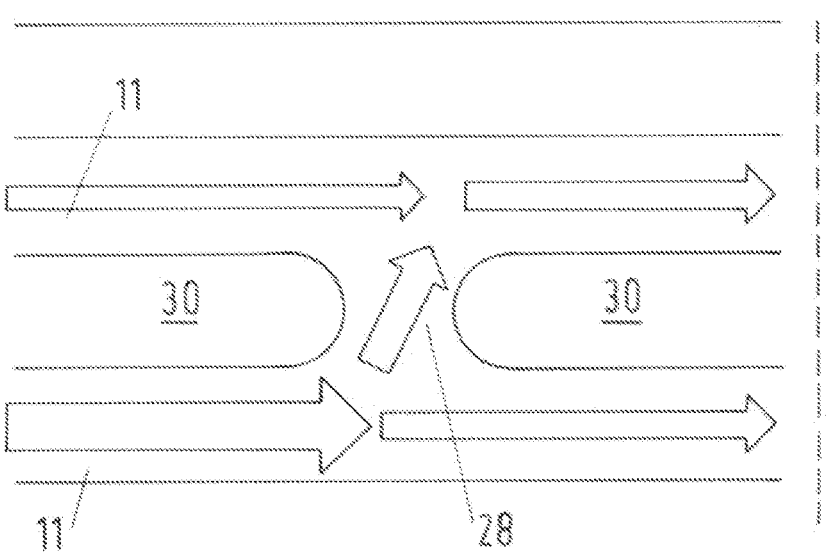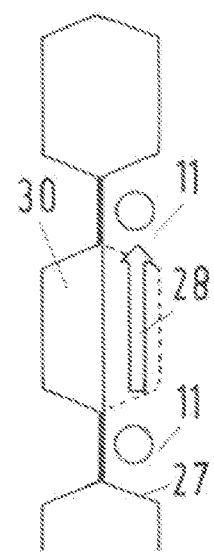
Fig.11  Fig.12
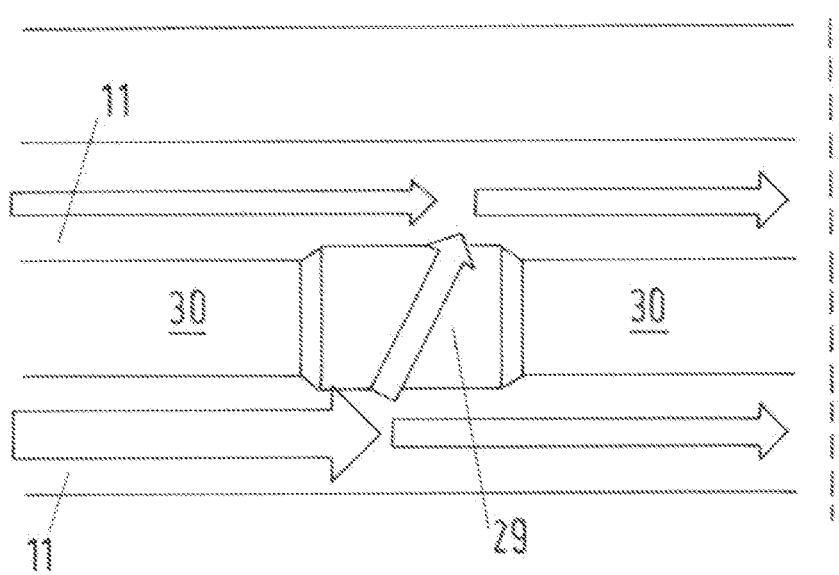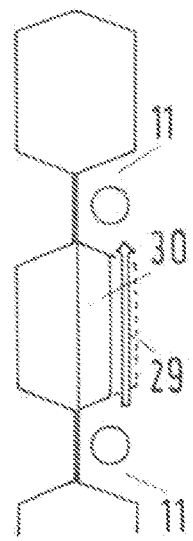
Fig.13  Fig.14

BIPOLAR PLATE

BACKGROUND

Technical Field

Embodiments of the invention relate to a bipolar plate having a first inlet port and a flow field comprising a plurality of ducts to connect the first inlet port to a first outlet port for a first reactant, and having a second inlet port and a flow field comprising a plurality of ducts to connect the second inlet port to a second outlet port for a second reactant, wherein at least one bypass duct is present at the margin of at least one of the flow fields, and wherein the bypass duct is associated with at least one flow connection branching off from the bypass duct into an adjacent marginal duct of the flow field.

Description of the Related Art

A fuel cell comprises a membrane electrode assembly made from a proton-conducting membrane, on one side of which the anode and on the other side the cathode is formed. In a fuel cell device, multiple fuel cells are generally put together in linear fashion to form a fuel cell stack, in order to make possible a sufficiently large power production.

Reactant gases are supplied to the electrodes of the fuel cells by means of bipolar plates, namely, hydrogen in particular on the anode side and oxygen or an oxygen-containing gas on the cathode side, especially air. When supplying the fuel cell, the reactants are taken via a duct into the plate, and a distributing of the reactants into an active region should be achieved by utilizing the duct or a plurality of ducts, in order to supply the entire area of the electrodes as evenly as possible by means of a flow field. The fresh reactant gases are continually consumed by the chemical reaction taking place on the entire area of the active region, so that the partial pressures of the reactant gases decrease from the inlet to the outlet, while the fraction of the product gases increases.

In addition to the reactant gases, a coolant is also taken through the bipolar plate, so that three different media need to be taken, tightly separated from each other, on the smallest of spaces. Therefore, two molded metal pieces are generally welded together to form a bipolar plate, and because of the design space requirement an overlap region must be provided around the active flow field, in which hollow spaces arise on account of the fabrication and assembly tolerances, through which reactant gases can flow past the flow field, i.e., an unwanted bypass exists, the cross section of which is decreased by blocking elements. Even so, reactant gases make it past the active region, unutilized, to the outlet. In DE 10 2017 118 143 A1, an embossing is formed as a blocking element in a bypass duct of a first bipolar plate, disrupting the direction of flow of the reactant and producing turbulence and pressure increases, which deflect the reactant out of the bypass duct into a gas diffusion layer, situated between the first bipolar plate and a second bipolar plate. A uniform feeding of the flow field by the inlet ducts for the fuel and the oxidizing agent is described in US 2012/0129071 A1, where inlet buffers are formed downstream from the inlets for an improved even distribution over the entire width of the flow field. DE 10 2016 225 651 A1 describes an end cell heating arrangement in which bypass flow paths are provided in a housing for connecting the inlet distributors and the outlet distributors, in order to divert droplets flowing into the fuel cell stack.

BRIEF SUMMARY

Some embodiments provide a bipolar plate in which the utilization of at least one of the reactants is improved.

The above mentioned bipolar plate offers the benefit that less reactant is taken from the inlet port through the bypass duct directly to the outlet duct and thus not being available for the reaction. Instead, the loss through the bypass flow is reduced and at the same time the decrease in concentration resulting from the consumption of the reactants in the flow field is alleviated, since fresh reactant in the original concentration is continually supplied to the flow field. The bypass duct itself runs in a region of the plate lying outside of the active region in which the electronic reaction occurs.

The resulting benefits are especially evident when a respective bypass duct is present on both sides of the first flow field and on both sides of the second flow field, and when at least one flow connection branches off into the adjacent marginal duct from each of the bypass ducts. This makes use of the fact that reactant flows are generally present on both sides of each individual flow field, and thus there is a better utilization of each reactant and less of this is taken directly to the outlet port. Thus, an increasing of the reactant concentration is also present at both margins of the respective flow field.

The flow connection may be provided in the half of the flow field facing toward the outlet port. In this half, a significant reduction of the concentration of the reactants or of their partial pressure already exists, so that the supplying of the reactants from the bypass duct further results in an increased concentration or an increased partial pressure and so the desired reaction occurs better. An inadequate supply may therefore be prevented.

It may also be advantageous for the bypass duct to be associated with multiple flow connections, which are configured at a spacing from each other in the flow direction, since this achieves a better utilization of the reactant flow in the bypass duct and an incomplete diversion through the first flow connection can be corrected by the subsequent flow connections.

An improved utilization of the reactant flow is also achieved in that a bypass blocker is arranged in the bypass duct upstream from the outlet port, so that the diversion through the flow connection occurs on account of the bypass blocker. The bypass blocker can therefore also be formed by a significantly increased flow resistance or by gaskets or sealing structures in order to constrain the reactant flow onto the path of the lesser resistance through the flow connection.

If a marginal duct connection to the adjacent duct of the flow field is provided in the marginal duct downstream from the flow connection, and if respective adjacent ducts have a duct connection downstream from the marginal duct connection in the flow field, then the fresh gas of the reactant can be provided for multiple ducts transversely to the flow direction in the flow field, so that not just the outermost duct of the flow field, i.e., the marginal duct, will profit from the bypass flow.

The fabrication of the bipolar plate generally involves a forming of metal plates, so that the ducts of the flow field and the bypass duct are separated from each other by webs. Then the flow connection can be easily realized by a reduction of the web height. This advantage is also present when the marginal duct connection and/or the duct connection is realized by a reduction of the web height. The web height can also be entirely reduced, i.e., down to zero web height, since this makes the forming process easier.

The features and combinations of features mentioned above in the specification and also the features and combinations of features mentioned below in the description of the figures and/or shown solely in the figures can be used not only in the particular indicated combination, but also in other combinations or standing alone. Thus, configurations which are not explicitly shown in the figures or discussed, yet emerging from and achievable by separate combinations of features from the explained embodiments, are to be seen as being also encompassed and disclosed by embodiments of the invention.

BRIEF DESCRIPTION OF THE SEVERAL VIEWS OF THE DRAWINGS

Further benefits, features and details will emerge from the claims, the following description of embodiments, and the figures.

FIG. 3 shows a top view of a schematic representation of a bipolar plate known from the prior art with the schematically represented concentration drop in the reactant gas in a flow field and the indicated bypass flows.

FIG. 4 shows a cross section through a bipolar plate known from the prior art in the duct direction of the flow field.

FIG. 11 shows a representation corresponding to FIG. 6 illustrating the embodiment according to FIG. 10.

FIG. 12 shows a representation of the embodiment of FIG. 10, corresponding to FIG. 7.

FIG. 13 shows a representation of a further embodiment corresponding to FIG. 11.

FIG. 14 shows a representation of the embodiment of FIG. 13, corresponding to FIG. 12.

DETAILED DESCRIPTION

Figure 1:
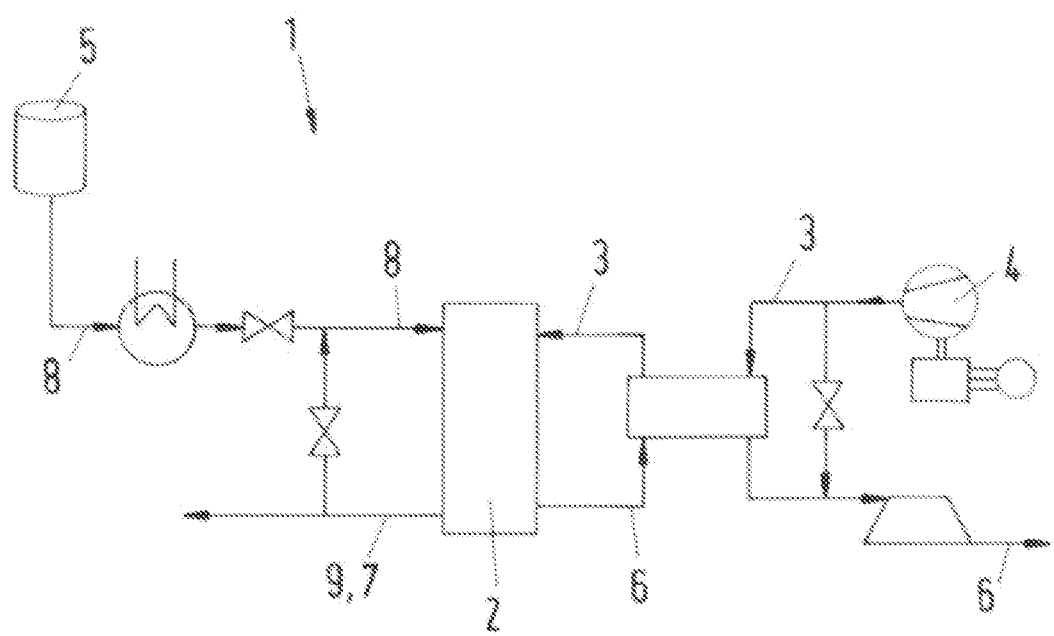
FIG. 1 shows a schematic representation of a fuel cell device having a fuel cell stack comprising a plurality of fuel cells, the fuel cells having bipolar plates.

FIG. 1 shows schematically a fuel cell device 1, having a fuel cell or a plurality of fuel cells combined into a fuel cell stack 2.

The fuel cell stack 2 consists of a plurality of fuel cells hooked up in series. Each of the fuel cells encompasses an anode and a cathode as well as a proton-conducting membrane separating the anode from the cathode. The membrane is formed from an ionomer, such as a sulfonated tetrafluorethylene polymer (PTFE) or a polymer of perfluorinated sulfonic acid (PFSA). Alternatively, the membrane can be formed as a sulfonated hydrocarbon membrane.

In addition, a catalyst may be blended in with the anodes and/or the cathodes, the membranes being coated on their first side and/or on their second side with a catalyst layer of a precious metal or mixtures comprising precious metals such as platinum, palladium, ruthenium or the like, serving as reaction accelerators in the reaction of the respective fuel cell.

Through anode spaces inside the fuel cell stack 2, the anodes are supplied with fuel (such as hydrogen). In a polymer electrolyte membrane fuel cell (PEM fuel cell), fuel or fuel molecules are split at the anode into protons and electrons. The membrane allows the protons (for example, $H^+$) to pass, but is impervious to the electrons ($e^-$). The following reaction will occur at the anode: $2H_2 \rightarrow 4H^+ + 4e^-$ (oxidation/electron donation). While the protons pass through the membrane to the cathode, the electrons are taken by an external circuit to the cathode or to an energy accumulator. Through cathode spaces inside the fuel cell stack 2, cathode gas (such as oxygen or air containing oxygen) can be supplied to the cathodes, so that the following reaction occurs at the cathode side: $O_2 + 4H^+ + 4e^- \rightarrow 2H_2O$ (reduction/electron uptake).

Figure 2:
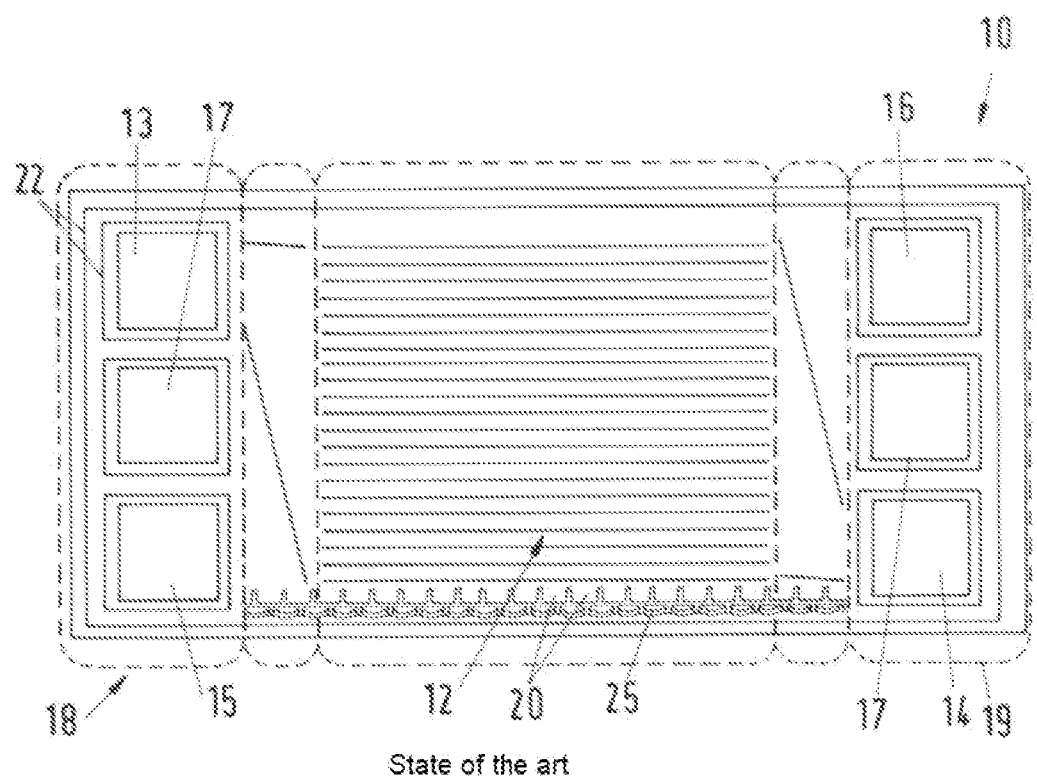
FIG. 2 shows a top view of a schematic representation of a bipolar plate known from the prior art.

Air compressed by a compressor 4 is supplied to the fuel cell stack 2 via a fresh cathode gas line 3. In addition, the fuel cell is connected to a cathode exhaust line 6. At the anode side, hydrogen kept on hand in a hydrogen tank 5 is supplied to the fuel cell stack 2 via a fresh anode gas line 8 in order to provide the reactants needed for the electrochemical reaction in a fuel cell. These gases are transferred to bipolar plates 10, in which ducts 11 are formed, and which are assembled to form a flow field 12 for the distribution of the gases to the membrane. In addition, the bipolar plates 10 are provided to carry a coolant, so that three different media are carried in the smallest space. Bipolar plates 10 known from the prior art are shown in FIGS. 2 to 4, where FIG. 2 shows the inserting through a first inlet port 13 for a membrane, with handover to the flow field 12, and drainage through a first outlet port 14. For the second reactant, the back side of the bipolar plate 10 is available in comparable manner with a second inlet port 15 and a second outlet port 16. The first inlet port 13 and the second inlet port 15 may be combined with a medium port 17 for a coolant to form an inlet header 18. Analogously, an outlet header 19 is available.

A bypass flow streams past the flow field 12, which may not be fully prevented by bypass-blocking structures 20. FIG. 3 shows the fundamental fact that, due to the consumption of the reactant, its partial pressure decreases from the inlet header 18 to the outlet header 19. FIG. 4 shows the known layout of bipolar plates 10, for which two molded metal pieces 21 are provided with sealing grooves 22 and welded together. Above and below the bipolar plates 10 are arranged the membrane electrode assemblies MEA 23. Also shown are the ducts 11 for the fuel and the oxidation agent and the ducts 24 for the coolant.

Figure 5:
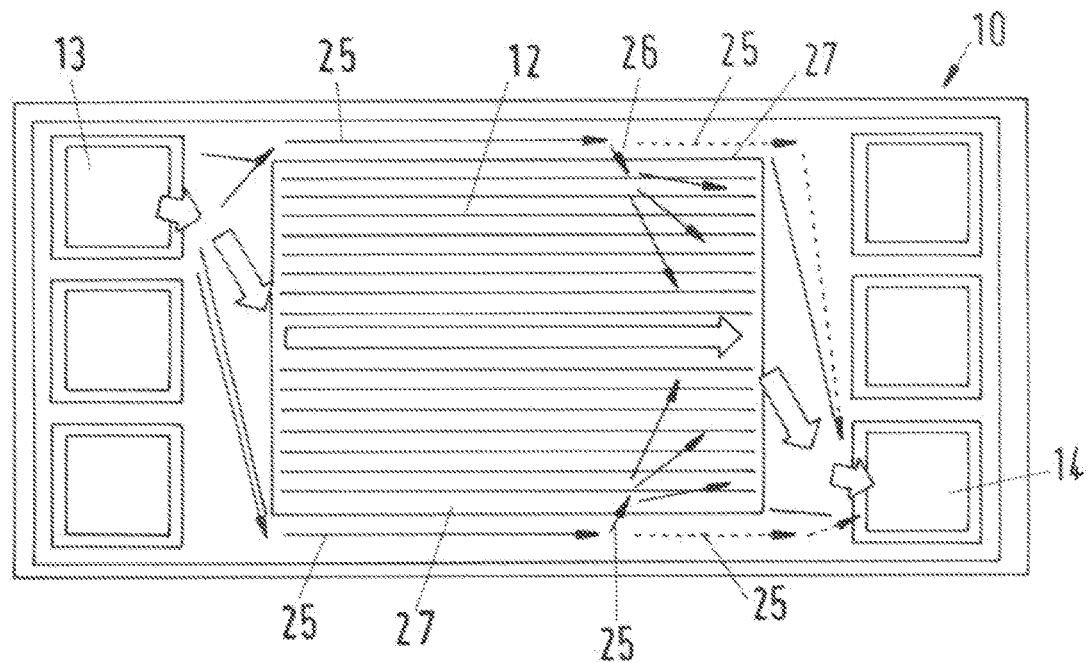
FIG. 5 shows a representation of an improved bipolar plate.

In a bipolar plate 10 shown as an example in FIG. 5 and having a first inlet port 13 and a first flow field 12 comprising a plurality of ducts 11 for connecting the first inlet port 13 to a first outlet port 14 for a first reactant, and having a second inlet port 15 and a second flow field comprising a plurality of ducts 11 for connecting the second inlet port 15 to a second outlet port 16 for a second reactant, wherein at least one bypass duct 25 is present at the margin of at least one of the flow fields 12, the design is such that the bypass duct 25 is associated with at least one flow connection 26, which branches off from the bypass duct 25 into an adjacent marginal duct 27 of the flow field 12. In the embodiments shown, a respective bypass duct 25 is present on both sides of the first flow field 12 and on both sides of the second flow field 12, and at least one flow connection 26 branches off from each of the bypass ducts 25 into the adjacent marginal duct 27. This is shown in FIG. 5 for one of the flow fields 12 for one of the reactants, the relations being designed accordingly for the second flow field.

FIG. 5 also reveals that the flow connection 26 is formed in the half of the flow field 12 facing toward the outlet port 14, in order to introduce the reactants into the region of the flow field 12 where a significant reduction of the reactant concentration already exists.

Figure 15:
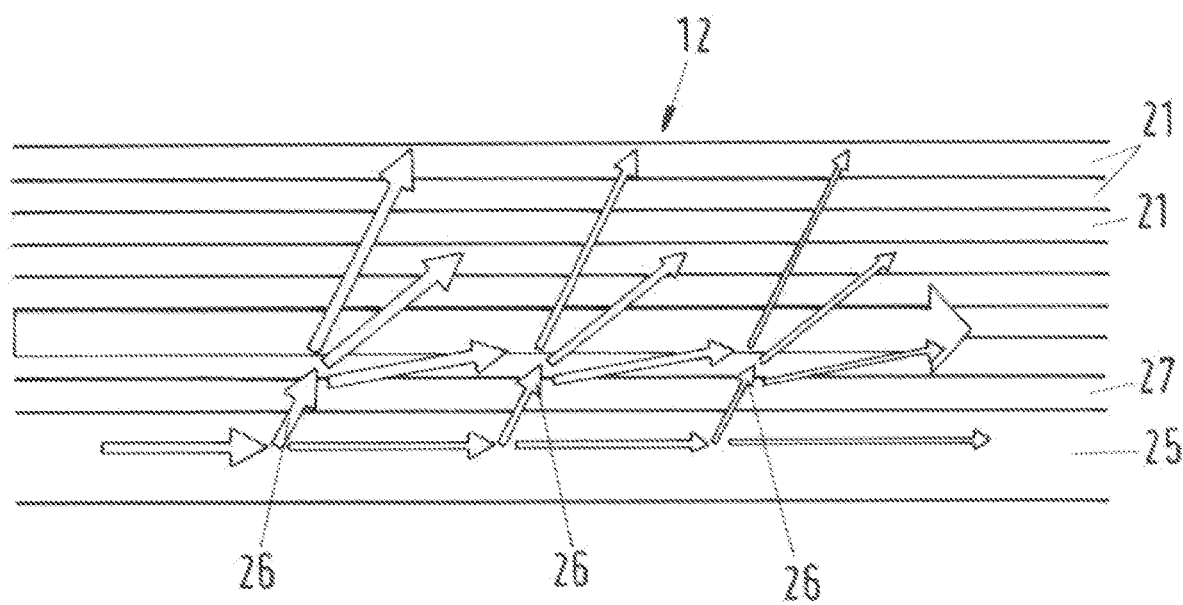
FIG. 15 shows a representation corresponding to FIG. 10 for the multiple inserting of the bypass flow into the flow field.

FIG. 15 shows that multiple flow connections 26 can also be associated with the bypass duct 25, being spaced apart from each other in the flow direction, i.e., fresh gas can be resupplied to the flow field 12 at different points.

Figure 10:
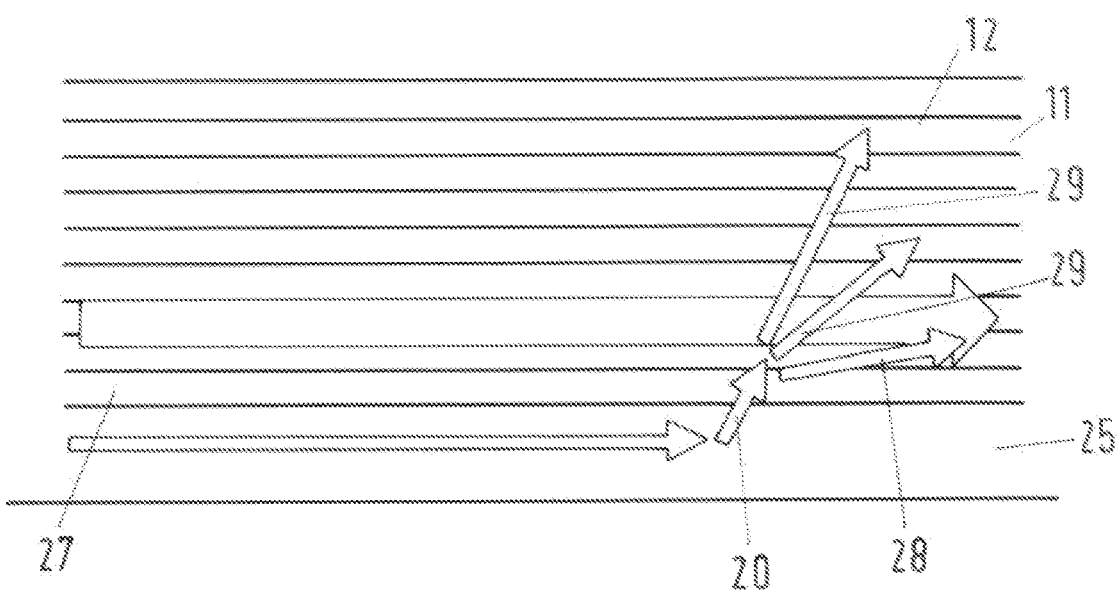
FIG. 10 shows a diagram showing the utilization of the bypass flow in multiple ducts of the flow field.

FIGS. 10 and 11 show that a marginal duct connection 28 to the adjacent duct 11 of the flow field 12 is formed in the marginal duct 27 downstream from the flow connection 26. Also, respective adjacent ducts 11 have a duct connection 29 downstream from the marginal duct connection 28 in the flow field 12. Thus, the possibility exists of resupplying fresh gas transversely to the flow direction in the flow field 12, so that not just the marginal duct 27 of the flow field 12 can make use of the bypass flow.

Figure 7:
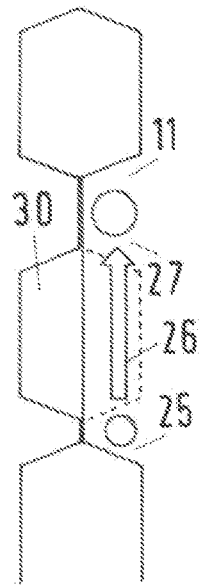
FIG. 7 shows a simplified schematic representation for the inserting of the bypass flow into the marginal duct of the flow field.
Figure 8:
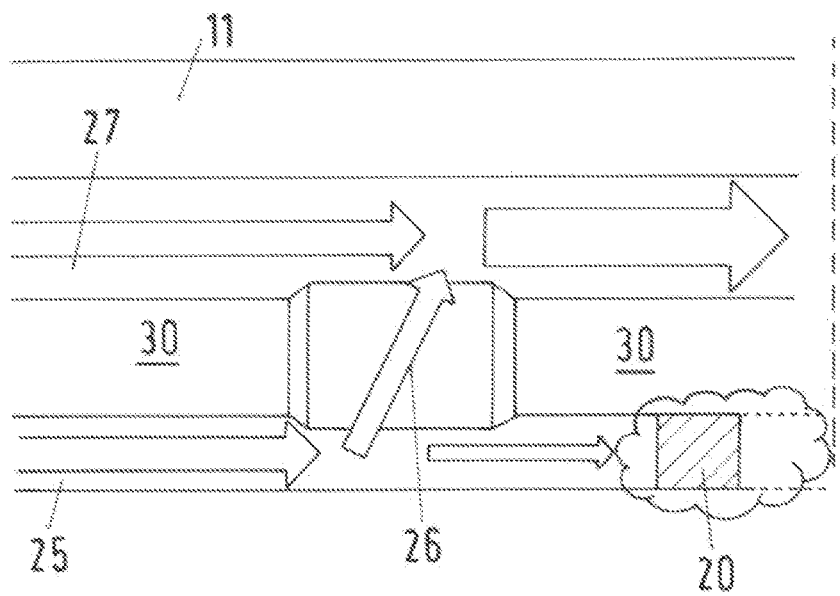
FIG. 8 shows a representation of an alternative embodiment corresponding to FIG. 6.
Figure 9:
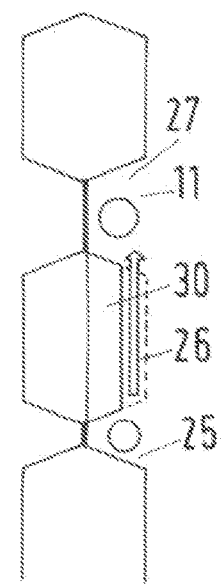
FIG. 9 shows a representation of the embodiment of FIG. 8, corresponding to FIG. 7.

FIG. 4 shows that the ducts 11 of the flow field 12 and the bypass duct 25 are separated from each other by webs 30. In the embodiments shown, the flow connection 26 is realized by a reduction of the web height, also in relation to the marginal duct connection 28 and the duct connection 29, and the reduction of the web height may be complete, that is, the web 30 disappears in these regions, as is shown in FIGS. 7 and 12.

Figure 6:
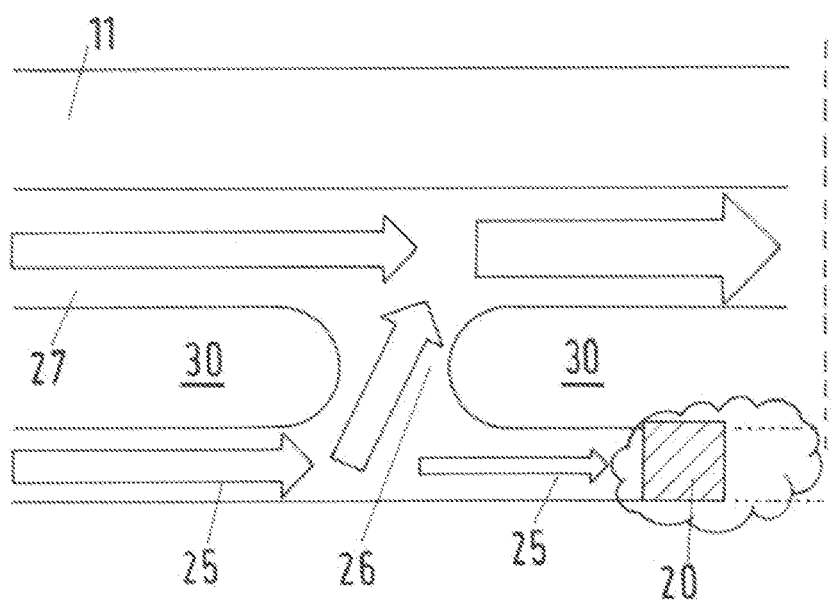
FIG. 6 shows a diagram showing the utilization of the bypass flow.

Upstream from the outlet port 14 there is arranged in the bypass duct 25 a bypass blocker, namely, the bypass-blocking structure 20 (FIG. 6), which serves for the bypass flow taking the path of least resistance and streaming through the flow connection 26.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate, comprising:
a first inlet port;
a first flow field comprising a first plurality of ducts to connect the first inlet port to a first outlet port for a first reactant;
a second inlet port; and
a second flow field comprising a second plurality of ducts to connect the second inlet port to a second outlet port for a second reactant;
wherein at least one bypass duct is present at the margin of at least one of the flow fields;
wherein the bypass duct is associated with at least one flow connection branching off from the bypass duct into an adjacent marginal duct of the at least one of the flow fields; and
wherein a bypass blocker is arranged in the at least one bypass duct upstream from the outlet port to assist in directing reactant flow through the at least one flow connection to the adjacent marginal duct of the at least one of the flow fields.

2. The bipolar plate according to claim 1, wherein both of the first and second flow fields and at least one respective bypass duct are present on either side of the bipolar plate, and wherein at least one respective flow connection branches off from each of the bypass ducts into a respective adjacent marginal duct.

3. The bipolar plate according to claim 1, wherein the at least one flow connection is provided in a half of the flow field adjacent to the outlet port.

4. The bipolar plate according to claim 1, wherein the at least one bypass duct is associated with multiple flow connections, which are configured at a spacing from each other in the flow direction.

5. The bipolar plate according to claim 1, wherein a marginal duct connection to an adjacent duct of the flow field is provided in the marginal duct downstream from the flow connection.

6. The bipolar plate according to claim 5, wherein respective adjacent ducts have a duct connection downstream from the marginal duct connection in the flow field.

7. The bipolar plate according to claim 6, wherein the marginal duct connection and/or the duct connection is realized by a reduction of the web height.

8. The bipolar plate according to claim 1, wherein the ducts of the flow field and the bypass duct are separated from each other by webs, and the flow connection is realized by a reduction of a web height of the web between the bypass duct and the adjacent marginal duct.

9. The bipolar plate according to claim 8, wherein the web height is entirely reduced.

10. A bipolar plate of a fuel cell, the bipolar plate comprising:
an inlet port;
an outlet port;
a flow field comprising a plurality of ducts that connect the inlet port to the outlet port for distributing a reactant within an active region of the bipolar plate during operation of the fuel cell; and
at least one bypass duct that extends alongside the flow field at a margin of the flow field outside the active region of the bipolar plate;
wherein the bypass duct is associated with one or more flow connections branching off from the bypass duct into an adjacent marginal duct of the flow field; and
wherein the one or more flow connections are provided only in a downstream half of the flow field adjacent to the outlet port.

* * * * *